UNITED STATES PATENT OFFICE 2,520,611

DIETHERS OF POLYOXYALKYLENE DIOLS

Frederick Hoffman Roberts, Charleston, W. Va., and Harvey Rowe Fife, Pittsburgh, Pa., assignors, by mesne assignments, to Union Carbide and Carbon Corporation, a corporation of New York No Drawing. Application December 5, 1946, Serial No. 714,140

16 Claims. (Cl. 260—615)

This invention relates to polyoxyalkylene diethers; that is, diethers of polyoxyalkylene diols or glycols. It is more particularly concerned with compositions of relatively high average molecular weight which are complex mixtures of polyoxyalkylene diethers in which the polyoxyalkylene chains are predominantly formed of oxyethylene groups, —$OC_2H_4$—, and oxy 1,2-propylene groups, —$OC_2H_3(CH_3)$—. By way of illustration, diethers in which the oxyalkylene groups are either oxyethylene or oxy 1,2-propylene, may be represented by the formula

in which $R^1O$— and —$OR^2$ are terminal ether groups; $n$ has a value of both 2 and 3 in the same molecule, and $x$ is an integer representing the total number of oxyethylene and oxy 1,2-propylene groups. Such diether compositions may be obtained, for instance, by the etherification of the polyoxyethylene-oxy 1,2-propylene diol compositions, or of the polyoxyethylene-oxy 1,2-propylene monohydroxy monoether compositions described, respectively, in Patents Nos. 2,425,845 and 2,425,755, granted on applications Serial Nos. 589,646, filed April 21, 1945, and 538,340, filed June 1, 1944, From such properties as average molecular weight, refractive index, density, viscosity, rate of change of viscosity with change in temperature, as well as upon theoretical considerations, it appears that the compositions which may be made by etherifying the polyoxyethylene-oxy 1,2-propylene diols or their monoethers are complex mixtures of diethers of polyoxyalkylene diols, having polyoxyalkylene chains of different lengths and different internal configuration, with ether groups, —OR, appearing at the ends of the chains and containing in a single molecule both the oxyethylene group and the oxy 1,2-propylene group.

By way of illustration, in a polyoxyalkylene diether compound having a polyoxyalkylene chain containing six oxyethylene and oxy 1,2-propylene groups, with from two to five oxy 1,2-propylene groups present therein the molecular weight attributable to the oxyalkylene chain, exclusive of the $R^1$, $OR^2$ terminal groups, would be 292, 306, 320 or 334, respectively, and in mixtures of such compounds the average molecular weight attributable to the oxyalkylene chain would be between 292 and 334, with an oxide ratio between 60.3–39.7 and 13.2–86.8 corresponding thereto. By oxide ratio is meant the proportion, by weight, of ethylene oxide (or oxyethylene groups) to 1,2-propylene oxide (or oxy 1,2-propylene groups) present in an oxide mixture or combined in a polyoxyalkylene diether composition. Compounds having but a single oxy 1,2-propylene group would have an oxyethylene content above that of compositions having a 75–25 oxide ratio, and are omitted.

Similarly, in compounds having seven oxyalkylene groups to the molecule with from two to six oxy 1,2-propylene groups present therein, the molecular weight attributable to the oxyethylene-oxy 1,2-propylene chain would be 336, 350, 364, 378 and 392, respectively; and in mixtures of such compounds the average molecular weight attributable to the polyoxyalkylene chain would be between 336 and 392 with an oxide ratio between 65.5–34.5 and 11.2–88.8 corresponding thereto.

Likewise, in compounds having from two to seven oxy 1,2-propylene groups in an oxyalkylene chain of eight oxyalkylene groups, the molecular weights of such chains would be 380, 394, 408, 422, 436 and 450, respectively; and in a mixture of such compounds the average molecular weight attributable to the polyoxyalkylene chain would be between 380 and 450, with an oxide ratio corresponding thereto between 69.5–30.5 and 9.8–90.2.

In diether compounds having nine oxyethylene and oxy 1,2-propylene groups, the molecular weight attributable to the oxyalkylene chain would be 438, 452, 466, 480, 494 or 508, depending on whether three, four five, six, seven or eight oxy 1,2-propylene groups were present therein; and in mixtures of such compounds the average molecular weight attributable to the oxyalkylene chain would be between 438 to 508, with an oxide ratio between 60.3–39.7 and 8.7–91.3, corresponding thereto.

In diether compounds having ten oxyethylene and oxy 1,2-propylene groups, the molecular weight attributable to the oxyalkylene chain would be 468, 482, 496, 510, 524, 538, 552 and 566, depending on whether two, three, four, five, six, seven, eight or nine oxy 1,2-propylene groups were present therein; and in mixtures of such compounds the average molecular weight attributable to the oxyalkylene chain would be between 468 and 566 with an oxide ratio corresponding thereto between 75.2–24.8 and 7.8–92.2. To each of the foregoing values for molecular weights and average molecular weights there is to be added the molecular weight of the terminal groups $R^1$, $OR^2$ having a minimum value of 46, corresponding to dimethyl ether, $CH_3OCH_3$.

A composition having in admixture the diethers of the above-mentioned polyoxyalkylene chains would comprise as many as thirty constituents of different molecular weights, with a spread of 274 units of molecular weight from the six oxyalkylene groups in the smallest molecule to 10 oxalkylene groups in the largest. Depending upon the relative proportions of the 30 constituents of different molecular weights, the composition would have an oxide ratio between 75.2–24.8 and 7.8–92.2, and an average molecular weight between 338 and 612. The complexity of the mixture is due not only to the differences in the molecular weights of the constituents but also to the large number of isomers arising out of the random (i. e. interspersed) distribution of the oxyethylene and oxy 1,2-propylene groups, with consequent variations in internal configuration from molecule to molecule, even among compounds of the same molecular weight. The higher the average molecular weight of the diether compositions the more complex the mixture. The novel compositions may be referred to as mixtures of heteric oxyethylene-oxy 1,2-propylene diethers, and by the term "heteric" we mean that the diether constituents of the mixture vary in internal arrangement or configuration from molecule to molecule, the variations arising out of the unordered distribution of the oxyethylene and the oxy 1,2-propylene groups therein, such as may result, for instance, from the concurrent reaction of ethylene oxide and 1,2-propylene oxide in producing the oxyethylene-oxy 1,2-propylene diol mixtures or their monoethers, from which the diethers may be prepared.

Using diethyl sulfate as the etherifying agent, for instance, a large number of diether compositions may be produced from the polyoxy-ethylene-oxy 1,2-propylene diol compositions and their monoethers. The reaction for making the ethyl, ethyl diethers may be represented by the following equations:

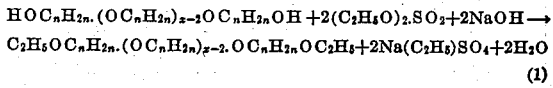

(1)

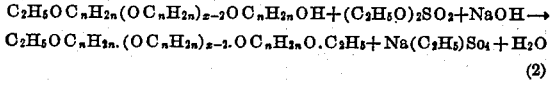

(2)

in which $n$ has a value of 2 and 3 in the same molecule and $x$ is an integer representing the total number of oxyethylene and oxy 1,2-propylene groups. For instance, from the polyoxyethylene-oxy 1,2-propylene diol compositions made in accordance with the copending Toussaint and Fife application filed April 21, 1945, Serial No. 589,646, the diethyl ethers may be obtained over a wide range of oxide ratios extending from at least one-third part to upwards of nine parts of 1,2-propylene oxide for each part of ethylene oxide. In general, the etherification reaction may be carried out using from two to four mols of diethyl sulfate for each mol of diol composition. Sodium hydroxide (solid) or other suitable alkali metal hydroxide is also used in the proportion of two mols of the hydroxide per mol of diethyl sulfate. A diluent or solvent, for instance dibutyl ether or toluene, may also be used, if desired. The diol composition to which has been added the solid caustic and the diluent may be heated to a temperature of about 70 to 80° C. While the heated mixture is stirred or agitated, the diethyl sulfate is then added slowly. The reaction is exothermic and the mixture is maintained at a temperature of about 90° to 95° C. by cooling or by regulating the rate of addition of the diethyl sulfate, or both. If the average molecular weight of the diol composition is low and the amount of caustic is relatively large, the reaction mixture may tend to become gelatinous. This condition may be avoided by the addition of a solvent or diluent.

When all the diethyl sulfate has been added, the temperature is held between 90° and 100° C. over a period of three to five hours, with continued stirring, to complete the reaction. If the temperature is permitted to increase during this period, some diethyl ether may be evolved. The product is then washed several times with water at a temperature of about 80° C. until a pH range of about 7 to 8 results. If desired, however, the product may be neutralized with carbon dioxide or phosphoric acid to the same pH value. Following the washing, the diether composition will usually be found in the top layer. It is stripped of water, diluent and any unhydrolyzed diethyl sulfate by heating at a temperature up to 185° C. To assist in the stripping, the pressure may be reduced more or less gradually during the heating to an end pressure of 20-millimeters or below. The stripped product may then be filtered to remove salts which are rendered insoluble on stripping.

To prepare a mixed diether composition it may be advantageous to use a monoether composition as a starting material, for instance a butyl monoether composition, instead of the diol composition. Substantially the same procedure may be followed as for the preparation of the diethyl ether composition from the diol, except that from one to two mols of diethyl sulfate may be employed.

Another method of making the diether compositions from the diol mixtures or their monoethers is by means of an organic halide and sodium hydroxide.

The reaction may be illustrated by the following equations for preparation of the diethyl ethers:

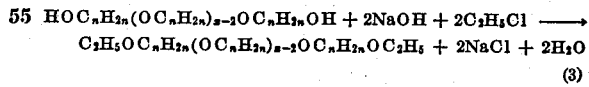

(3)

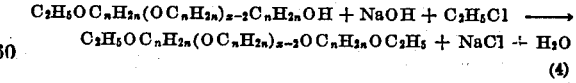

(4)

The etherification may be carried out, for instance, using from about eight mols of organic halide per mol of the diol composition to about four mols of organic halide per mol of the monoether composition. There is used, in addition, about 1.25 mols of sodium hydroxide (solid) or other alkali metal hydroxide per mol of organic halide. Because the formation of unsaturated hydrocarbons by dehydrohalogenation of the organic halide is a competing reaction, a large excess of the organic halide is preferably employed. All of the reactants may be charged into a suitable reaction vessel, preferably one equipped with a stirrer and a decanting head. A diluent may also be added, for instance toluene. Usually an amount of diluent which is from 30 to 50 per cent by weight of the reactants is adequate, but larger or smaller quantities may be used.

The reaction mixture is heated to a temperature which will ordinarily be about 100° to 140° C. for most preparations. The water which is evolved is removed by decantation of the distillate and the heating continued until the rate at which water is evolved attains a minimum. Usually about 20 to 30 hours are required.

Upon completion of the reaction, the product is filtered and washed with water several times at room temperature. The washed product is then stripped by heating it under reduced pressure at temperatures as high as 185° C., as above described, and then filtered to remove insoluble matter.

The diether compositions of the present invention are characterized by a rate of change of viscosity with change in temperature which is below that of the diol or monoether of the same oxide ratio. For instance, a butyl ethyl diether composition having an oxide ratio of 50-50 and a viscosity of 10 centistokes at 210° F. has a viscosity ratio of 42 (20° F./210° F.) which is to be compared with a viscosity ratio of 58 (20° F./210° F.) for a butyl monoether composition of the same oxide ratio and having the same viscosity at 100° F. (By the expression 42 (20° F./210° F.) and 58 (20° F./210° F.) is meant the ratio of the viscosity at 20° F. to the viscosity at 210° F.). In other words, for compositions of the same viscosity at 210 °F., the increase in viscosity with decrease in temperature is less for the butyl ethyl diether composition than it is for the butyl monoether monohydroxy composition of the same oxide ratio. The same is true for the dialkyl ethers having up to eight carbon atoms to the alkyl group as compared with the monoether; for instance methyl, propyl, butyl, hexyl, octyl and the like, which may be employed in various diether combinations. These diether compositions are useful for low-temperature instrument oils, hydraulic fluids, and the lubricating component of low temperature greases, as well as other lubricating or energy-transmitting applications where low temperatures are encountered. They have the advantage that the viscosity and lubricating characteristics which enable them to be used at low temperatures are retained to a high degree at the relatively high temperatures which also may be encountered. Among other characteristics of the diether compositions is the property of wetting bearing surfaces and maintaining a lubricating film under severe conditions of high loads and high rates of shear. The miscibility of the diether compositions with hydrocarbon oils is also superior to that of the polyoxyethylene-oxy 1,2-propylene diol mixtures and their monoethers. This characteristic is reflected in the ability of the diether compositions to retain hydrocarbon sludges in solution, even at low temperatures, when used as a crankcase lubricant for internal combustion engines, and it has the advantage of making for greater ease of engine starting at sub-zero temperature. Still another advantage of the oil-miscibility of the diether compositions is their solvent action on organic sludges which tend to accumulate on bearing surfaces, particularly where hydrocarbon lubricants have been used. The removal of the sludge results in lower bearing temperature and a lessened chance for bearing failure. Furthermore, inorganic impurities having a catalytic action favoring the rupture of the oxyalkylene chain are much less soluble in the diether compositions than in the diols or their monoethers, thus affording a higher stability of the diethers, particularly at elevated temperatures.

The diether compositions of the present invention in which the ether groups are aliphatic and have from one to eighteen or more carbon atoms are useful as lubricants, as pressure transmitting fluids and for a variety of uses. In general, those diethers in which the ether groups contain from two to eight carbon atoms, inclusive, to the aliphatic ether group seem to have the better lubricating and viscosity characteristics and are preferred. This is particularly the case where both groups are the same or different saturated aliphatic radicals, as for instance ethyl, propyl, butyl, pentyl, hexyl, heptyl and octyl.

Compositions in which the weight of oxy 1,2-propylene groups does not substantially exceed the weight of oxyethylene groups; that is, compositions having an oxide ratio from about 50-50 to 75-25 exhibit a higher water-tolerance or water-miscibility characteristic than do those containing a preponderance of oxy 1,2-propylene groups over oxyethylene groups. Because of the higher water-miscibility, these diether compositions having an oxide ratio of about 75-25 to 50-50, may be preferred for uses in which water-tolerance is desirable. As metal lubricants they may be used with non-aqueous viscosity-reducing diluents, for instance, the butyl monoether of tetraethylene glycol, as well as the mono and diethers of the monoglycols, diglycols, triglycols and tetraglycols.

Where fluidity, pumpability and freedom from crystallization at low temperatures are required, diether compositions having from one to about nine parts of oxy 1,2-propylene groups for each part of oxyethylene groups, by weight, are preferred.

The higher the average molecular weight the less is the influence of the size of the aliphatic ether groups on the properties. For instance, in a methyl, methyl diether composition, the weight attributable to the dimethyl ether grouping, $CH_3OCH_3$, 46, would be about ten per cent of an average molecular weight of 500, whereas for an octyl octyl diether, the dioctyl ether grouping, $C_8H_{17}OC_8H_{17}$, 242, would constitute about half. The compositions with which this invention is more particularly concerned are those in which the part of the average molecular weight attributable to the oxyethylene and oxy 1,2-propylene groups is about 500 or more, with an average molecular weight of at least about 742 for the octyl octyl diether compositions, for instance, and with correspondingly higher average molecular weights for the higher aliphatic diethers. For use as metal lubricants, pressure transmitting fluids and base fluids for use with a viscosity-reducing diluent, and the like, compositions having an average molecular weight such that the part attributable to the oxyethylene and oxy 1,2-propylene groups is about 1000 or more, are preferred.

The examples which follow are illustrative.

*Example 1*

A polyoxyethylene-oxy 1,2-propylene butyl, ethyl diether composition having an oxide ratio of 75-25 and an average molecular weight of 681, determined ebullioscopically, was made by the action of diethyl sulfate on a polyoxyethylene-oxy 1,2-propylene butyl monoether monohydroxy composition having an oxide ratio of 75-25, an average molecular weight of 735, by acetyl value, and a viscosity of 38.2 centistokes (178 S. U. S.) at 100° F. and 7.98 centistokes (52.3 S. U. S.) at 210° F.

The diether composition was found to have a viscosity of 22.7 centistokes (109 S. U. S.) at 100° F. and 5.78 centistokes (45 S. U. S.) at 210° F.; a specific viscosity in benzene solution of 0.1366 at 18° C.; a density of 0.9632 at 210° F.; and a refractive index of 1.4519 at 20° C.

Example 2

Methyl, ethyl diether compositions having oxide ratios of 50-50 and average molecular weights of 600 and 794, respectively, as determined by ebullioscopy, were made by the action of diethyl sulfate on polyoxyethylene-oxy 1,2-propylene methyl monoether monohydroxy compositions having average molecular weights of 541 and 895, by acetylation, and viscosities of 23.8 centistokes (111.2 S. U. S.) and 50.9 centisokes (227.7 S. U. S.) respectively, at 100° F.

The diether compositions were found to have the following properties:

| Mol. Weight | Viscosity, Centistokes | | | Spec. Visc. in Benzene at 18° C. | Refractive Index, 20° C. | Density 210° F. |
|---|---|---|---|---|---|---|
| | 20° F. | 100° F. | 210° F. | | | |
| 600 | 92.5 | 14.6 | 4.14 | 0.1044 | 1.4462 | 0.9461 |
| 794 | 265 | 31.8 | 7.52 | 0.1479 | 1.4505 | 0.9627 |

The ratios of the viscosities at 20° F. to those at 210° F. were calculated to be 22.7 and 35.2, respectively.

Example 3

Ethyl, ethyl diether compositions having oxide ratios of 50-50 and average molecular weights of 700 and 1875, determined ebullioscopically, were made by the action of diethyl sulfate on polyoxyethylene-oxy 1,2-propylene diol compositions having oxide ratios of 50-50, average molecular weights of about 1006 and 3250, by acetylation; and viscosities at 100° F. of 76.3 centistokes (353 S. U. S.) and 468 centisokes (2160 S. U. S.), respectively.

An ethyl, ethyl diether composition having an oxide ratio of 50-50 and an average molecular weight of 1390, determined ebullioscopically, was made by the action of ethyl chloride and sodium hydroxide on a polyoxyethylene-oxy 1,2-propylene diol composition having an oxide ratio of 50-50, an average molecular weight of about 1911, by acetylation, and a viscosity at 100° F. of about 175 centisokes (809 S. U. S.).

The ethyl, ethyl diether compositions thus obtained were found to have the following properties:

| Mol. Weight | Viscosity, Centistokes | | | Spec. Visc. in Benzene at 18° C. | Refractive Index, 20° C. | Density 210° C. | Viscosity Ratio 20°/210° F. |
|---|---|---|---|---|---|---|---|
| | 20° F. | 100° F. | 210° F. | | | | |
| 700 | 289 | 30.9 | 7.84 | 0.1586 | 1.4501 | 0.9585 | 36.9 |
| 1,390 | 1,525 | 114.2 | 23.0 | 0.2623 | 1.4576 | 0.9859 | 66.3 |
| 1,875 | 5,888 | 364 | 65 | 0.4075 | 1.4589 | 0.9906 | 90.6 |

Example 4

Butyl, ethyl diether compositions having an oxide ratio of 50-50 and average molecular weights of about 885, 985, 1409 and 1965, determined ebullioscopically, were made by the action of diethyl sulfate on polyoxyethylene-oxy 1,2-propylene butyl monoether monohydroxy compositions having an oxide ratio of 50-50, average molecular weights of about 900, 1019, 1790 and 2858, by acetylation; and viscosities at 100° F. of 54.6, 56.9, 144 and 1044 centistokes, respectively.

The butyl, ethyl diether compositions were found to have the following properties:

| Mol. Weight | Viscosity, Centistokes | | | Spec. Visc. in Benzene at 18° C. | Refractive Index, 20° C. | Density 210° F. | Viscosity Ratio 20°/210° F. |
|---|---|---|---|---|---|---|---|
| | 20° F. | 100° F. | 210° F. | | | | |
| 885 | 312 | 36 | 8.6 | 0.1604 | 1.4518 | 0.9576 | 36.6 |
| 985 | 394 | 41.55 | 9.7 | 0.1697 | 1.4523 | 0.9639 | 40.6 |
| 1,409 | 1,342 | 114 | 22.8 | 0.2504 | 1.4568 | 0.9799 | 58.8 |
| 1,965 | 12,642 | 799 | 137 | 0.5643 | 1.4588 | 0.9912 | 92.2 |

Example 5

A tetradecyl, ether diether composition having an oxide ratio of 50-50 and an average molecular weight of 943, determined ebullioscopically, was made by the action of diethyl sulfate on a polyoxyethylene-oxy 1,2-propylene tetradecyl monoether monohydroxy composition having an oxide ratio of 50-50, an average molecular weight of 1224, by acetylation; and a viscosity of 104.8 centistokes (484 S. U. S.) at 100° F. and 18.6 centistokes (92.3 S. U. S.) at 210° F.

The diether composition was found to have a viscosity of 75.8 centistokes (350 S. U. S.) at 100° F. and 15.5 centistokes (79.7 S. U. S.) at 210° F., a viscosity ratio (20°/210° F.) of 59.4, a specific viscosity in benzene solution of 0.2163 at 18° C., a density of 0.9430 at 210° F., and a refractive index of 1.4541 at 20° C.

Example 6

A butyl, ethyl diether composition having an oxide ratio of 25-75 and an average molecular weight of 904, determined ebullioscopically, was made by the action of diethyl sulfate on a polyoxyethylene-oxy 1,2-propylene butyl monoether monohydroxy composition having an oxide ratio of 25-75, an average molecular weight of 963, by acetylation; and a viscosity of 52.5 centistokes (243 S. U. S.) at 100° F. and 10.3 centistokes (60.3 S. U. S.) at 210° F.

The butyl, ethyl diether composition was found to have a viscosity of 31.3 centistokes (147 S. U. S.) at 100° F. and 8.51 centistokes (53.7 S. U. S.) at 210° F., a viscosity ratio (20°/210° F.) of 39.2, a specific viscosity in benzene solution of 0.1560 at 18° C., a density of 0.9393 at 210° C. and a refractive index of 1.4480 at 20° C.

Example 7

A butyl, ethyl diether composition having an oxide ratio of 10-90 and an average molecular weight of 915, determined ebullioscopically, was made by the action of diethyl sulfate on a polyoxyethylene-oxy 1,2-propylene butyl monoether monohydroxy composition having an oxide ratio of 10–90, an average molecular weight of 1021, by acetylation; and a viscosity of 54.3 centistokes (251 S. U. S.) at 100° F. and 10.3 centistokes (60.3 S. U. S.) at 210° F.

The resulting butyl, ethyl diether composition of 10–90 oxide ratio was found to have a viscosity of 38.9 centistokes (181 S. U. S.) at 100° F. and 8.75 centistokes (54.9 S. U. S.) at 210° F., a viscosity ratio (20°/210° F.) of 43.9, a specific viscosity in benzene solution of 0.1452 at 18° C., a density of 0.9265 at 2.0° F., and a refractive index of 1.4460 at 20° C.

Example 8

A polyoxyethylene-oxy 1,2-propylene butyl, butyl diether composition having an oxide ratio of 50–50 and average molecular weight of 855, determined ebullioscopically, was made by the action of butyl chloride and caustic soda on a polyoxyethylene-oxy 1,2-propylene butyl monoether monohydroxy composition having an average molecular weight of about 900, by acetylation; and a viscosity at 100° F. of about 54.6 centistokes (253 S. U. S.).

The resulting butyl, butyl diether composition of 50–50 oxide ratio was found to have the following properties:

| Mol. Weight | Viscosity, Centistokes | | | Spec. Visc. in Benzene at 18° C. | Refractive Index, 20° C. | Density, 210° F. | Viscosity Ratio, 20°/210° F. |
|---|---|---|---|---|---|---|---|
| | 20° F. | 100° F. | 210° F. | | | | |
| 855 | 325 | 35.3 | 8.52 | 0.1604 | 1.4512 | 0.9481 | 38.2 |

Example 9

A butyl, normal octyl diether composition having an oxide ratio of 50–50 and an average molecular weight of about 732, determined ebullioscopically, was made by the action of normal octyl chloride and caustic soda on a polyoxyethylene-oxy 1,2-propylene butyl monoether monohydroxy composition of the same oxide ratio, average molecular weight and viscosity, as were used as the starting material for the preparation of the butyl, butyl diether composition of Example 8.

The resulting butyl, normal octyl diether composition having an oxide ratio of 50–50 was found to have the following properties:

| Mol. Weight | Viscosity, Centistokes | | | Spec. Visc. in Benzene at 18° C. | Refractive Index, 20° C. | Density, 210° F. | Viscosity Ratio, 20°/210° F. |
|---|---|---|---|---|---|---|---|
| | 20° F. | 100° F. | 210° F. | | | | |
| 732 | 325 | 35.83 | 8.74 | 0.1589 | 1.4514 | 0.9317 | 37.2 |

Example 10

A butyl, normal dodecyl diether composition having an oxide ratio of 50–50 and an average molecular weight of 870, determined ebullioscopically, was made by the action of normal dodecyl bromide and caustic soda on a polyoxyethylene-oxy 1,2-propylene butyl monoether monohydroxy composition having an oxide ratio of 50–50, an average molecular weight of about 900, by acetylation; and a viscosity of about 54.6 centistokes (253 S. U. S.) at 100° F.

The butyl, normal dodecyl diether composition which resulted was found to have a viscosity of 39.49 centistokes at 100° F. and 9.3 centistokes at 210° F.; a specific viscosity of 0.1694 in benzene solution at 18° C.; a refractive index of 1.4532 at 20° C.; a density of 0.9257 at 210° F.; and a viscosity index (ASTM) of 165.

Example 11

A butyl, 2-ethylbutyl diether composition having an oxide ratio of 50–50 and an average molecular weight of about 791, determined ebullioscopically, was made by the action of 2-ethylbutyl chloride and caustic soda on a polyoxyethylene-oxy 1,2-propylene butyl monoether monohydroxy composition of the same average molecular weight and viscosity as was used as the starting material for the preparation of the butyl, butyl diether composition of Example 8.

The resulting butyl, ethyl butyl diether composition having an oxide ratio of 50–50, was found to have the following properties:

| Mol. Weight | Viscosity, Centistokes | | | Spec. Visc. in Benzene at 18° C. | Refractive Index, 20° C. | Density, 210° F. | Viscosity Ratio, 20°/210° F. |
|---|---|---|---|---|---|---|---|
| | 20° F. | 100° F. | 210° F. | | | | |
| 791 | 421 | 42.32 | 9.52 | 0.1695 | 1.4529 | 0.9495 | 44.2 |

Example 12

A butyl, 2-ethylhexyl diether composition having an oxide ratio of 50–50 and an average molecular weight of 666, determined ebullioscopically, was made by the action of 2-ethylhexyl chloride and caustic soda on a polyoxyethylene-oxy 1,2-propylene butyl monoether monohydroxy composition having an oxide ratio of 50–50, an average molecular weight of about 900, by acetylation, and a viscosity of 54.6 centistokes (253 S. S. S.) at 100° F.

The butyl, 2-ethylhexyl diether composition which resulted, had viscosities of 330, 36.05 and 8.5 temperatures of 20° F., 100° F. and 210° F., respectively, a specific viscosity in benzene at 18° C. of 0.1563, a refractive index of 1.4510 at 20° C., a density at 210° F. of 0.9337 and a viscosity ratio (20°/210° F.) of 38.8.

Example 13

A polyoxyethylene-oxy 1,2-propylene butyl, allyl diether composition having an oxide ratio of 50–50 and an average molecular weight of about 930, determined ebullioscopically, was made by the action of allyl chloride and caustic soda on a polyoxyethylene-oxy 1,2-propylene butyl monoether monohydroxy composition having an oxide ratio of 50–50, an average molecular weight of about 900, by acetylation, and a viscosity of about 54.6 centistokes (253 S. U. S.) at 100° F., the same as the starting material in Example 12.

The butyl, allyl diether composition, having a 50–50 oxide ratio which resulted, was found to have the following properties: viscosities at 20°, 100° and 210° F. of 345, 37.68, and 8.94 centistokes, respectively; specific viscosity in benzene of 0.1762 at 18° C., refractive index of 1.4547 at 20° C., a density of 0.9585 at 210° F., and a viscosity ratio (20°/210° F.) of 38.6.

*Example 14*

A butyl, ethyl diether composition having an oxide ratio of 50–50 and an average molecular weight of about 832, determined ebullioscopically, was made by the action of diethyl sulfate and a polyoxyethylene-oxy-1,2-propylene butyl monoether monohydroxy composition having an oxide ratio of 50–50, an average molecular weight of 900, by acetylation, and a viscosity of 10.65 centistokes (61.5 S. U. S.) at 100° F. and 54.56 centistokes (253 S. U. S.) at 210° F.

The diether composition was found to have a viscosity of 36.8 centistokes (171 S. U. S.) at 100° F. and 8.76 centistokes (55 S. U. S.) at 210° F.; a viscosity ratio (20°/210° F.) of 38.1; a specific viscosity in benzene solution of 0.1633 at 18° C.; a density of 0.9602 at 210° F.; and a refractive index of 1.4512 at 20° C.

The term "viscosity index" as used herein corresponds to the conventional viscosity index calculations for petroleum products and lubricants in accordance with the definitions accepted by the American Society for Testing Materials (see Industrial and Engineering Chemistry (1935), volume 27, pages 82 and 1441).

By the abbreviation or symbol S. U. S. is meant Saybolt Universal seconds as a measurement of viscosity.

The invention is susceptible of modification within the scope of the appended claims.

We claim:

1. A mixture of aliphatic diethers of polyoxyalkylene diols characterized by polyoxyalkylene chains containing both oxyethylene and oxy 1,2-propylene groups therein; said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third part of oxy 1,2-propylene for each part of oxyethylene, by weight.

2. A mixture of saturated aliphatic diethers of polyoxyalkylene diols characterized by polyoxyalkylene chains containing both oxyethylene and oxy 1,2-propylene groups therein; said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third part of oxy 1,2-propylene for each part of oxyethylene, by weight.

3. A mixture of alkyl diethers of polyoxyalkylene diols characterized by polyalkylene chains containing both oxyethylene and poly 1,2-propylene groups therein, and the alkyl groups thereof having from two to eight carbon atoms, inclusive; said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third part of oxy 1,2-propylene for each part of oxyethylene, by weight.

4. A mixture of butyl, ethyl diethers of polyoxyalkylene diols characterized by polyoxyalkylene chains containing both oxyethylene and oxy 1,2-propylene groups therein; said mixture predominating in said oxyethylene and oxy 1,2-propylene groups and having an average molecular weight such that the portion thereof attributable to said oxyethylene and oxy 1,2-propylene is at least 500; and said groups being present in said mixture in a ratio of at least one-third part of oxy 1,2-propylene for each part of oxyethylene, by weight.

5. A mixture of aliphatic diethers of polyoxyalkylene diols characterized by polyoxyalkylene chains containing both oxyethylene and oxy 1,2-propylene groups therein; said mixture predominating in said oxyethylene and oxy 1,2-propylene groups and having an average molecular weight such that the portion thereof attributable to said oxyethylene and oxy 1,2-propylene groups is at least 1000; and said groups being present in said mixture in a ratio of at least one-third part of oxy 1,2-propylene for each part of oxyethylene, by weight.

6. A mixture of saturated aliphatic diethers of polyoxyalkylene diols characterized by polyoxyalkylene chains containing both oxyethylene and oxy 1,2-propylene groups therein; said mixture predominating in said oxyethylene and oxy 1,2-propylene groups and having an average molecular weight such that the portion thereof attributable to said oxyethylene ond oxy 1,2-propylene groups is at least 1000; and said groups being present in said mixture in a ratio of at least one-third part of oxy 1,2-propylene for each part of oxyethylene, by weight.

7. A mixture of alkyl diethers of polyoxyalkylene diols characterized by polyalkylene chains containing both oxyethylene and poly 1,2-propylene groups therein, and the alkyl groups thereof having from two to eight carbon atoms, inclusive; said mixture predominating in said oxyethylene and oxy 1,2-propylene groups and having an average molecular weight such that the portion thereof attributable to said oxyethylene and oxy 1,2-propylene groups is at least 1000; and said groups being present in said mixture in a ratio of at least one-third part of oxy 1,2-propylene for each part of oxyethylene, by weight.

8. A mixture of butyl, ethyl diethers of polyoxyalkylene diols characterized by polyoxyalkylene chains containing both oxyethylene and oxy 1,2-propylene groups therein; said mixture predominating in said oxyethylene and oxy 1,2-propylene groups and having an average molecular weight such that the portion thereof attributable to said oxyethylene and oxy 1,2-propylene groups is at least 1000; and said groups being present in said mixture in a ratio of at least one-third part of oxy 1,2-propylene for each part of oxyethylene, by weight.

9. A mixture of aliphatic diethers of polyoxyalkylene diols characterized by polyoxyalkylene chains containing both the oxyethylene and oxy 1,2-propylene groups therein, said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third to one part of oxy 1,2-propylene for each part of oxyethylene, by weight.

10. A mixture of saturated aliphatic diethers of polyoxyalkylene diols characterized by polyoxyalkylene chains containing both the oxyethylene and oxy 1,2-propylene groups therein, said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third to one part of oxy 1,2-propylene for each part of oxyethylene, by weight.

11. A mixture of alkyl diethers of polyoxyalkylene diols characterized by polyoxyalkylene chains containing both oxyethylene ond oxy 1,2-propylene groups therein, and the alkyl groups thereof having from two to eight carbon atoms, inclusive; said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third to one part of oxy 1,2-propylene for each part of oxyethylene, by weight.

12. A mixture of butyl, ethyl diethers of polyoxyalkylene diols characterized by polyoxyalkylene chains containing both the oxyethylene and oxy 1,2-propylene groups therein, said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one-third to one part of oxy 1,2-propylene for each part of oxyethylene, by weight.

13. A mixture of aliphatic diethers of polyoxyalkylene diols characterized by polyoxyalkylene chains containing both the oxyethylene and oxy 1,2-propylene groups therein, said mixture predominating in said oxyethylene and oxy 1,2-propylene groups and having an average molecular weight such that the portion thereof attributable to said oxyethylene and oxy 1,2-propylene groups is at least 500, and said groups being present in said mixture in a ratio of at least one to nine parts of oxy 1,2-propylene for each part of oxyethylene, by weight.

14. A mixture of saturated aliphatic diethers of polyoxyalkylene diols characterized by polyoxyalkylene chains containing both the oxyethylene and oxy 1,2-propylene groups therein, said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one to nine parts of oxy 1,2-propylene for each part of oxyethylene, by weight.

15. A mixture of alkyl diethers of polyoxyalkylene diols characterized by polyoxyalkylene chains containing both oxyethylene and oxy 1,2-propylene groups therein, and the alkyl groups thereof having from two to eight carbon atoms, inclusive; said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one to nine parts of oxy 1,2-propylene for each part of oxyethylene, by weight.

16. A mixture of butyl, ethyl diethers of polyoxyalkylene diols characterized by polyoxyalkylene chains containing both the oxyethylene and oxy 1,2-propylene groups therein, said mixture predominating in said oxyethylene and oxy 1,2-propylene groups and having an average molecular weight such that the portion thereof attributable to said oxyethylene and oxy 1,2-propylene groups is at least 500; and said groups being present in said mixture in a ratio of at least one to nine parts of oxy 1,2-propylene for each part of oxyethylene, by weight.

FREDERICK HOFFMAN ROBERTS.
HARVEY ROWE FIFE.

REFERENCES CITED

The following references are of record in the file of this patent:

UNITED STATES PATENTS

| Number | Name | Date |
|---|---|---|
| 2,425,755 | Roberts et al. | Aug. 19, 1947 |
| 2,425,845 | Toussaint | Aug. 19, 1947 |
| 2,448,664 | Fife et al. | Sept. 7, 1948 |